Patented Feb. 28, 1950

2,498,872

UNITED STATES PATENT OFFICE 2,498,872

MERCAPTAN SYNTHESIS

Richmond T. Bell and Carlisle M. Thacker, Highland Park, Ill., assignors to The Pure Oil Company, Chicago, Ill., a corporation of Ohio No Drawing. Application February 17, 1945,
Serial No. 578,561

15 Claims. (Cl. 260—609)

This invention relates to the preparation of mercaptans from olefinic hydrocarbons and hydrogen sulfide by reaction in the presence of a Friedel-Crafts catalyst, particularly anhydrous aluminum chloride or anhydrous aluminum chloride-hydrocarbon complexes.

It has been discovered that olefinic hydrocarbons and hydrogen sulfide react readily in the presence of Friedel-Crafts catalysts, particularly fluoboric acid, mixtures of hydrogen fluoride and boron trifluoride, anhydrous aluminum chloride and bromide, and their hydrocarbon complexes, to form mercaptans and that the extent of reaction is dependent on temperature, pressure, time of reaction and ratio of catalyst to olefin present in the reaction mixture. Although the invention is applicable to the synthesis of mercaptans from different olefins or mixtures thereof with each other or with other hydrocarbons, it is particularly directed to the synthesis of mercaptans from dodecenes.

EFFECT OF PRESSURE ON MERCAPTAN SYNTHESIS

In this synthesis of mercaptans from crude triisobutylene it has been discovered that within the preferred temperature range of about −30° to 80° C. the highest conversions of trimer (triisobutylene) to mercaptans measured as mercaptan sulfur occur at pressures of approximately 80 to 200 pounds per square inch. In general, the preferred pressure range for obtaining high conversions is between 100 to 200 pounds per square inch. In order to demonstrate the effect of pressure on the mercaptan synthesis, a series of runs was made at different pressures, with other reaction conditions remaining substantially constant. The results of these runs are set forth in the following Table I. In these runs the trimer was charged to a reaction vessel in six equal units. An initial charge of 0.3 mole of anhydrous aluminum chloride was charged to the reactor and each unit of trimer was stirred with the aluminum chloride for a period of one-quarter of an hour, after which the reaction mixture was permitted to settle for a period of approximately five minutes and the upper layer withdrawn, leaving the aluminum chloride-hydrocarbon complex in the reactor for use in connection with the subsequent units of trimer charged to the reactor. The reaction product from each unit and the complex were hydrolyzed with 5–10% hydrochloric acid in order to remove any aluminum chloride. In all runs, an excess of hydrogen sulfide was maintained under pressure in the reactor. The reactor used was an 18–8 stainless steel pipe having a length of 11½ inches and an inside diameter of three inches, equipped with a removable top and a stirrer which was operated by an electric motor.

*Table I*

| Run No. | Trimer Charged | | | | Mole Ratio Trimer to AlCl$_3$ for Unit Charge | Mole Ratio Total Trimer to AlCl$_3$ | Temp., °C. | Gage Press. lbs./sq. in. | Gms. Liquid Product from Total Units (a) and from Complex (b) | | Per cent RSH-S in (a) and (b) | Yield wt. ratio of RSH-S to AlCl$_3$ in total Liquid Product |
|---|---|---|---|---|---|---|---|---|---|---|---|---|
| | gms. unit | gms. total | moles unit | moles total | | | | | | | | |
| 1 | 144.5 | 867.0 | 0.91 | 5.45 | 3.03 | 18.17 | 23.6 | 20 | (a) | 748.3 | 4.5 | 0.973 |
| | | | | | | | | | (b) | 119.6 | 2.7 | |
| 2 | 143.0 | 858.0 | 0.90 | 5.40 | 3.00 | 18.00 | 22.8 | 30 | (a) | 799.0 | 9.4 | 2.058 |
| | | | | | | | | | (b) | 99.8 | 3.7 | |
| 3 | 144.3 | 866.0 | 0.91 | 5.45 | 3.03 | 18.17 | 24.2 | 60 | (a) | 802.7 | 11.2 | 2.485 |
| | | | | | | | | | (b) | 99.0 | 3.3 | |
| 4 | 143.5 | 861.0 | 0.90 | 5.41 | 3.00 | 18.03 | 25.4 | 102 | (a) | 818.4 | 11.7 | 2.584 |
| | | | | | | | | | (b) | 98.1 | 2.2 | |
| 5 | 143.0 | 858.0 | 0.90 | 5.40 | 3.00 | 18.00 | 25.1 | 151 | (a) | 835.9 | 12.4 | 2.883 |
| | | | | | | | | | (b) | 60.2 | 3.1 | |
| 6 | 145.0 | 870.0 | 0.91 | 5.47 | 3.03 | 18.21 | 24.8 | 180 | (a) | 824.2 | 12.1 | 2.746 |
| | | | | | | | | | (b) | 87.2 | 2.9 | |
| 7 | 239.0 | 1,434.0 | 1.50 | 9.00 | 3.00 | 18.00 | 24.9 | 2 | (a) | 1,340.1 | 3.1 | 0.688 |
| | | | | | | | | | (b) | 96.8 | 2.7 | |
| 8 | 239.0 | 1,434.0 | 1.50 | 9.00 | 3.00 | 18.00 | 24.5 | 10 | (a) | 1,404.0 | 7.6 | 1.709 |
| | | | | | | | | | (b) | 96.2 | 3.2 | |
| 9 | 239.0 | 1,434.0 | 1.50 | 9.00 | 3.00 | 18.00 | 24.7 | 41 | (a) | 1,413.8 | 8.4 | 1.885 |
| | | | | | | | | | (b) | 95.3 | 3.1 | |
| 10 | 239.0 | 1,434.0 | 1.50 | 9.00 | 3.00 | 18.00 | 25.6 | 60 | (a) | 1,437.1 | 9.6 | 2.178 |
| | | | | | | | | | (b) | 78.7 | 1.9 | |
| 11 | 239.0 | 1,434.0 | 1.50 | 9.00 | 3.00 | 18.00 | 24.6 | 81 | (a) | 1,444.9 | 10.5 | 2.380 |
| | | | | | | | | | (b) | 98.4 | 1.8 | |
| 12 | 239.0 | 1,434.0 | 1.50 | 9.00 | 3.00 | 18.00 | 24.8 | 101 | (a) | 1,434.7 | 11.1 | 2.523 |
| | | | | | | | | | (b) | 98.4 | 1.7 | |
| 13 | 239.0 | 1,434.0 | 1.50 | 9.00 | 3.00 | 18.00 | 25.9 | 152 | (a) | 1,424.5 | 11.2 | 2.577 |
| | | | | | | | | | (b) | 83.0 | 1.9 | |
| 14 | 239.0 | 1,434.0 | 1.50 | 9.00 | 3.00 | 18.00 | 25.3 | 181 | (a) | 1,406.0 | 10.5 | 2.408 |
| | | | | | | | | | (b) | 70.6 | 1.2 | |
| 15 | 244.5 | 244.5 | 1.54 | 1.54 | | | 22.2 | 180 | | 226.5 | 0.3 | 0.018 |

From the table it will be seen that the unit mole ratio of trimer to aluminum chloride in Runs 1 to 14 was 3 or approximately 3 and the mole ratio of total trimer charged to aluminum chloride was 18 or approximately 18. The initial charge of aluminum chloride to the reactor in Runs 1 to 6 was 0.3 mole. An attempt was made to maintain the temperature in each run at approximately 25° C. by means of a jacket surrounding the reactor through which cooling or heating medium could be circulated. The reaction is exothermic and, therefore, the temperature deviated to a small extent during each run.

In the first six runs, pressure was gradually increased from 20 pounds per square inch to 180 pounds per square inch. Run 5 which was carried out at 151 pounds per square inch gave a liquid product which contained the highest mercaptan-sulfur content and which gave the highest yield of mercaptan-sulfur per unit of aluminum chloride. It should be mentioned here that at the end of each run, that is, after six units of trimer had been charged to the reactor, and the liquid reaction product had been decanted, the aluminum chloride-hydrocarbon complex remaining in the reactor was hydrolyzed with 5 to 10% aqueous hydrochloric acid and the quantity of liquid product obtained from the hydrolysis was determined and the mercaptan-sulfur content thereof was also determined. In order to get the total yield in terms of weight ratio of mercaptan-sulfur to aluminum chloride, the mercaptan-sulfur in the liquid product obtained from hydrolysis of the catalyst complex was added to that of liquid products decanted after each unit operation.

The liquid product decanted after each unit operation is a mixture of unreacted trimer and mercaptans with slight amounts of other side reaction products.

The effect of pressure is also demonstrated in Runs 7 to 14. In this series of runs, the initial charge of aluminum chloride to the reactor was .5 mole. Here again maximum yield and maximum mercaptan-sulfur content in the reaction product was obtained at a pressure of 152. Run 15 was made without catalyst in order to demonstrate that substantially no mercaptan is formed in the absence of catalyst.

EFFECT OF TEMPERATURE

In order to determine the effect of temperature on the synthesis, a series of runs was made in a reactor made of iron pipe having an inside diameter of 2½ inches and equipped with a removable top, liquid and gas inlets, liquid draw-offs, and a mechanical stirrer driven by an electric motor. The capacity of the reactor up to the level of the gas outlet was about 800 cc. This series of runs was carried out under atmospheric pressure with a constant stream of hydrogen-sulfide passing into and out of the reactor, the quantity of hydrogen sulfide passed in for a given contact period being in a mole ratio to olefin present as a unit charge, of approximately 1:1. The contact period for each unit charge was one-half hour and six unit charges of olefin were made for a single charge of aluminum chloride in each run. The results of the series of runs are given in Table II.

Table II

| Run No. | Trimer Charged | | | | Mole Ratio Trimer to AlCl₃ for Unit Charge | Mole Ratio Total Trimer to AlCl₃ | Temp., °C. | Gage Press. lbs./sq. in. | Gms. Liquid Product from Total Units (a) and from Complex (b) | Per cent RSH-S in (a) and (b) | Yield Wt. Ratio RSH-S to AlCl₃ |
|---|---|---|---|---|---|---|---|---|---|---|---|
| | Gms. per Unit | Gms. Total | Mole per Unit | Mole Total | | | | | | | |
| 16 | 239 | 1,434 | 1.5 | 9.0 | 3.0 | 18.0 | −26 | Atm | (a) 1,238.1 (b) 185.1 | 3.73 3.80 | 0.837 |
| 17 | 239 | 1,434 | 1.5 | 9.0 | 3.0 | 18.0 | +1.0 | Atm | (a) 1,345.7 (b) 136.1 | 7.55 3.71 | 1.671 |
| 18 | 239 | 1,434 | 1.5 | 9.0 | 3.0 | 18.0 | +24.8 | Atm | (a) 1,400.1 (b) 143.4 | 10.18 5.29 | 2.324 |
| 19 | 239 | 1,434 | 1.5 | 9.0 | 3.0 | 18.0 | +50.0 | Atm | (a) 1,445.5 (b) 101.1 | 12.97 7.98 | 3.125 |
| 20 | 239 | 1,434 | 1.5 | 9.0 | 3.0 | 18.0 | +74.0 | Atm | (a) 1,368.7 (b) 123.8 | 10.61 9.16 | 2.529 |
| 21 | 239 | 1,434 | 1.5 | 9.0 | 3.0 | 18.0 | +100.0 | Atm | (a) 1,238.5 (b) 86.6 | 7.14 4.93 | 1.623 |

It will be seen from the table that as the temperature of the reaction increased from −26° C. to 50° C., the yield in terms of ratio mercaptan-sulfur to aluminum chloride increased. At 74° C. the yield decreased and this trend continued to 100° C. A maximum yield of mercaptan-sulfur is reached at a temperature of approximately 45° to 55° C. and the preferred operating range at atmospheric pressure with respect to yield of mercaptan-sulfur is from approximately 30° to 75° C.

Another series of runs was made to determine the effect of temperature on the reaction when conducted under superatmospheric pressure, adding only sufficient hydrogen sulfide to the reactor during the course of the reaction to maintain the desired pressure. This series of runs was made in the same reactor as used for the runs listed in Table I and triisobutylene was used as olefin charging stock. The results of the runs are tabulated in Table III.

Table III

| Run No. | Trimer Charged | | | | Mole Ratios | | Temp., °C. | Gage Press., p.s.i. | Unit Contact Time, Hours | Liquid Product from Total Units (a) and from Complex (b) gms. | Per Cent RSH-S in (a) and (b) | Yield Wt. Ratio RSH-S to AlCl₃ |
|---|---|---|---|---|---|---|---|---|---|---|---|---|
| | Unit, Gms. | Total, Gms. | Unit, Moles | Total, Moles | Unit Trimer to AlCl₃ | Total Trimer to AlCl₃ | | | | | | |
| 22 | 151.1 | 906.7 | 0.95 | 5.70 | 3.17 | 19.00 | −26 | 61 | 0.25 | (a) 775.8 (b) 70.1 | 7.6 3.8 | 1.783 |
| 23 | 147.5 | 885.3 | 0.93 | 5.57 | 3.10 | 18.57 | +1 | 61 | 0.25 | (a) 775.7 (b) 106.7 | 11.3 4.5 | 2.612 |
| 24 | 144.5 | 867.0 | 0.91 | 5.45 | 3.03 | 18.17 | 24 | 60 | 0.25 | (a) 822.2 (b) 105.6 | 11.6 3.3 | 2.601 |
| 25 | 143.4 | 860.5 | 0.90 | 5.41 | 3.00 | 18.03 | 61 | 60 | 0.25 | (a) 864.9 (b) 100.4 | 17.4 10.0 | 4.351 |
| 26 | 141.1 | 846.3 | 0.89 | 5.32 | 2.97 | 17.73 | 76 | 60 | 0.25 | (a) 929.8 (b) 80.9 | 19.2 11.6 | 4.888 |
| 27 | 144.7 | 868.4 | 0.91 | 5.46 | 3.03 | 18.20 | 98 | 62 | 0.25 | (a) 884.2 (b) 60.5 | 14.0 4.7 | 3.397 |

In this series of runs maximum mercaptan-sulfur yield appears at about 75° C. as compared with a maximum at about 50° C. in the series of runs conducted at atmospheric pressure.

Temperatures within the range of approximately 45–80° C. will give high yields of mercaptans measured as mercaptan sulfur.

EFFECT OF TIME OF CONTACT

In order to determine the effect of time of contact on the mercaptan synthesis, a series of runs was made in the same reactor as were the runs reported in Table I. In this series of runs reaction conditions were maintained substantially constant with the exception of time of contact. The results of this series of runs are reported in Table IV.

ring the catalyst and the charge for one-quarter of an hour, the mixture was permitted to settle for approximately five minutes and the upper liquid layer was withdrawn leaving a complex in the reactor for treatment of the subsequent unit.

It will be seen that where the charge was made in twelve separate units (Run No. 26) the yield of mercaptan-sulfur was 2.45 part per unit part by weight of aluminum chloride. When the charge was divided into only four units (Run No. 27), the yield of mercaptan-sulfur was only 2.03, and where the charge was reduced to two units, the mercaptan-sulfur yield was reduced to 0.96.

By charging a given quantity of olefin in multiple units for a single charge of catalyst instead of in a single charge, yield of mercaptans is increased and the increase is particularly notice-

Table IV

| Run No. | Trimer Charged | | | | Mole Ratio Trimer to AlCl₃ for Unit Charge | Mole Ratio Total Trimer to AlCl₃ | Temp., °C. | Gage Press. lbs./sq. in. | Time of Contact in Hours per Unit | Gms. Liquid Product from Total Units (a) and from Complex (b) | | Percent RSH-S in (a) and (b) | Yield Wt. Ratio RSH-S to AlCl₃ |
|---|---|---|---|---|---|---|---|---|---|---|---|---|---|
| | Gms. per Unit | Gms. Total | Mole per Unit | Mole Total | | | | | | | | | |
| 28 | 144.5 | 867.0 | 0.91 | 5.45 | 3.03 | 18.17 | 23.8 | 60 | 0.10 | (a) | 794.5 | 9.8 | 2.221 |
| | | | | | | | | | | (b) | 76.1 | 3.6 | |
| 29 | 144.3 | 866.0 | 0.91 | 5.45 | 3.03 | 18.17 | 24.2 | 60 | 0.25 | (a) | 802.7 | 11.2 | 2.485 |
| | | | | | | | | | | (b) | 99.0 | 3.3 | |
| 30 | 145.0 | 870.0 | 0.91 | 5.47 | 3.03 | 18.23 | 24.8 | 61 | 0.50 | (a) | 828.3 | 11.0 | 2.443 |
| | | | | | | | | | | (b) | 85.8 | 2.6 | |
| 31 | 145.8 | 875.0 | 0.92 | 5.50 | 3.07 | 18.33 | 25.2 | 61 | 1.00 | (a) | 817.5 | 11.7 | 2.675 |
| | | | | | | | | | | (b) | 84.0 | 3.0 | |

As is apparent, the yield in terms of ratio of mercaptan-sulfur to aluminum chloride gradually increases from one-tenth to one hour contact time. The preferred contact time is from fifteen to thirty minutes, although contact time may range from one minute to several hours.

EFFECT OF MULTIPLE CHARGING OF OLEFINS PER CHARGE OF ALUMINUM CHLORIDE

When carrying out the synthesis in a batch or semi-continuous operation, the yield of mercaptan measured as mercaptan-sulfur per unit of catalyst can be increased by charging the olefin to the reactor in a plurality of unit charges with agitation of each unit charge with the catalyst or catalyst complex followed by settling and separation of reaction mixture from the catalyst complex before the addition of a successive unit charge of olefin to the reactor. By charging olefin in a plurality of separate units instead of charging the entire batch of olefin in a one-step operation, a larger yield of mercaptan per unit aluminum chloride is obtained. The difference in yield obtained by the multiple unit charge as against the single batch charge is demonstrated by Table V.

able where the charge is divided into such units that the unit mole ratio of olefin to catalyst is not more than approximately 6 and preferably not more than 3. It has been found that the anhydrous aluminum chloride or its resulting complex reaches a low point of catalytic activity when the mole ratio of total olefin treated to aluminum chloride is approximately 18 and that the highest yields of mercaptans measured as mercaptan sulfur are obtained when the unit mole ratio of olefin to aluminum chloride is within the range of 1 to 3.

THE EFFECT OF TEMPERATURE AND THE OLEFIN CHARGED ON THE REACTION PRODUCT

The nature of the reaction product is dependent on the nature of the charging stock and the temperature of reaction. When charging true polymers, such as triisobutylene, as the olefin in the synthesis of mercaptans using a Friedel-Crafts catalyst, the mercaptans formed at temperatures of 0° C. or lower contain relatively high quantities of $C_{12}$ mercaptans and only amounts of lower boiling mercaptans. However, at temperatures above 25° C., in addition to the $C_{12}$ mercaptans, $C_8$ and $C_4$ mercaptans are produced

Table V

| Run No. | Trimer Charged | | | | Mole Ratio Trimer to AlCl₃ for Unit Charge | Mole Ratio Total Trimer to AlCl₃ | Temp., °C. | Gage Press. lbs./sq. in. | Time of Contact in Hours per Unit | Gms. Liquid Product from Total Units (a) and from Complex (b) | | Per cent RSH-S in (a) and (b) | Yield Wt. Ratio RSH-S to AlCl₃ |
|---|---|---|---|---|---|---|---|---|---|---|---|---|---|
| | Gms. per Unit | Gms. Total H6HH | Mole per Unit | Mole Total | | | | | | | | | |
| 32 | 74.4 | 892.5 | 0.47 | 5.61 | 1.57 | 18.70 | 23.7 | 62 | 0.25 | (a) | 811.7 | 10.7 | 2.450 |
| | | | | | | | | | | (b) | 94.2 | 2.5 | |
| 33 | 215.5 | 862.0 | 1.36 | 5.42 | 4.53 | 18.07 | 25.5 | 60 | 0.25 | (a) | 823.9 | 9.1 | 2.030 |
| | | | | | | | | | | (b) | 79.3 | 3.6 | |
| 34 | 433.0 | 866.0 | 2.72 | 5.44 | 9.07 | 18.13 | 23.8 | 60 | 0.25 | (a) | 771.6 | 4.4 | 0.960 |
| | | | | | | | | | | (b) | 81.5 | 3.0 | |

In this series of runs the initial charge of anhydrous aluminum chloride to the reactor was .3 mole and no additional catalyst was charged during the remainder of any one run. After stirring in considerable quantities. At temperatures between 0° and 100° C. from approximately ten to thirty percent of the total reaction product is composed of butyl mercaptans, chiefly tertiary butyl mercaptan. Thus, where it is desired to produce dodecyl mercaptans from triisobutylene, temperatures of 0° to approximately —30° C. should be used, although reaction may be carried out between temperatures of 25° to —50° C. Where production of butyl and octyl mercaptans is desired from high molecular weight hydrocarbons, temperatures of 25 to 100° C. and preferably 30 to 80° C. should be used and the hydrocarbons should be true polymeric olefins such as di, tri or tetra isobutylene.

EFFECT OF RATIO OF OLEFINS TO HYDROGEN-SULFIDE ON THE REACTION PRODUCT

Contrary to expectation, an excess of olefin equal to or in excess of that theoretically required to form alkyl sulfides, does not favor formation of the alkyl sulfide. Nearly all the hydrogen sulfide reacted is converted to mercaptan regardless of the ratio of olefin to hydrogen sulfide. Even where ratios of olefins to hyogen sulfide were maintained as high as 10 to 1, at temperatures of 25 to 50° C., atmospheric pressure and at contact periods of .5 to 1 hour, nearly all the hydrogen sulfide was converted to mercaptans.

Although the experimental work reported herein was performed using triisobutylene as charging stock, other olefinic charging stocks such as Gray tower polymers, gasoline or heavier distillate resulting from catalytic or thermal polymerization of hydrocarbon gases and the various polymers obtained by the polymerization of C4 olefins by means of the hot or cold sulfuric acid process may be used in the preparation of the mercaptans.

Mercaptans prepared in accordance with our process are useful as intermediates in the synthesis of organic compounds, as odorants for fuel gas, in the preparation of synthetic rubber and for a variety of other purposes.

Mixtures of olefins and mercaptans obtained, as a result of the process, may be separated by fractional distillation or by extraction with alkali-methanol containing 5 to 30% of water or by a combination of extraction and fractional distillation. If the difference in boiling points between the mercaptans and the hydrocarbons in the mixture is sufficiently great, separation can be effected by careful fractional distillation alone. Where the mixture of mercaptans and hydrocarbons is such that the boiling points are close together or the mercaptan content is low, it may be desirable to extract the mercaptans from the mixture by means of a solution of potassium hydroxide in methanol which has been diluted with sufficient water to sufficiently reduce the solubility of the hydrocarbons in the extraction solution and then to separate the mercaptans from the methanol alkali solution either by neutralization with weak acid, such as acetic acid, or by means of steam stripping in order to hydrolyze the mercaptans and remove them as an overhead distillate. If necessary the extracted and recovered mercaptans may be further purified by fractional distillation.

In commercial operation of the process, a plurality of reactors may be provided in order that olefins and hydrogen sulfide may be charged to one or more reactors while other reactors are settling or the reaction product or catalyst-complex is being removed therefrom. In such a series the olefin and hydrogen sulfide feed can be switched from one reactor to another as required.

Mercaptans prepared as aforesaid described can be prepared in a state of purity sufficiently high to meet commercial requirements.

This application is a continuation-in-part of our application Serial No. 516,548, filed December 31, 1943, which issued August 24, 1948, as United States Patent 2,447,481, entitled Method of synthesizing aliphatic mercaptans and sulfides.

It is claimed:

1. The process of synthesizing mercaptans comprising, contacting a mixture of olefinic hydrocarbons and hydrogen sulfide with a Friedel-Crafts catalyst under suitable conditions of time, temperature and pressure to promote reaction of said olefinic hydrocarbons and said hydrogen sulfide to mercaptans, and effecting contact of said olefinic hydrocarbon reactant in a plurality of units with said catalyst, in each of said units of hydrocarbon reactant the amount of olefin contacted with the catalyst being less than half the total quantity of olefin that can be processed before the said catalyst reaches substantial exhaustion with respect to its ability to promote the mercaptan reaction, separating reaction products from the resulting catalyst complex after reaction of each unit of reactant and before charging the next successive unit of reactant to the reaction zone, and using the said catalyst complex to promote reaction of each successive unit until the activity of the catalyst is too low for further use.

2. The process in accordance with claim 1 in which the number of units of reactant contacted with the catalyst is not more than will make the mol ratio of olefin to catalyst per unit less than about 2 to 1.

3. The process of synthesizing mercaptans comprising, contacting a mixture of olefinic hydrocarbons and hydrogen sulfide with a Friedel-Crafts catalyst at a temperature in the range from about —30° to 80° C., for a time sufficient to produce substantial reaction to mercaptan and under a pressure adequate to maintain the hydrocarbons in liquid phase, said olefinic hydrocarbon reactant being contacted with said catalyst in a plurality of units in each of which the amount of olefin contacted with the catalyst is less than half the total quantity of olefin that can be processed before the catalyst reaches substantial exhaustion with respect to its ability to promote the mercaptan reaction, separating reaction products from the resulting catalyst complex after reaction of each unit of reactant and before charging the next successive unit to the reaction zone and using the said catalyst complex to promote reaction of each successive unit of reactant until the activity of the catalyst is too low for further use.

4. The method in accordance with claim 3 in which the pressure is in the range from atmospheric to about 20 atmospheres, and the time of reaction is up to 30 minutes per unit of reactant.

5. The method in accordance with claim 3 in which the pressure is in the range from atmospheric to about 20 atmospheres, the time is up to 30 minutes per unit of reactant, the number of units of reactant is at least three and of a size such that the mol ratio of olefin to catalyst per unit of reactant is in the range of about 1 to 1 to 3 to 1.

6. The process of synthesizing mercaptans comprising, contacting a mixture of olefinic hydrocarbons and hydrogen sulfide with a Friedel-Crafts catalyst under a pressure in the range from 100 to 200 pounds per square inch for a period of about 15 to 30 minutes at a temperature in the range from about 45° to 80° C., thereby to promote reaction of said olefinic hydrocarbons and hydrogen sulfide to mercaptans, said olefinic hydrocarbon reactant being contacted with said catalyst in a plurality of units in each of which the amount of olefin contacted with catalyst is a minor portion of the total quantity of olefin that can be processed before the catalyst reaches substantial exhaustion with respect to its ability to promote the mercaptan reaction, separating reaction products from the resulting catalyst complex after reaction of each unit of reactant and before charging the next successive unit to the reaction zone and using the catalyst complex to promote reaction of each successive unit until the activity of the catalyst is too low for further use.

7. The process in accordance with claim 6 in which the number of units of olefin contacted with the catalyst is at least 3 and each unit is of a size such that the mol ratio of olefin to catalyst per unit of reactant is in the range of about 1 to 1 to 3 to 1.

8. The method of synthesizing mercaptans from triisobutylene and hydrogen sulfide comprising, contacting triisobutylene and hydrogen sulfide with anhydrous aluminum chloride as the essential catalyst at a temperature of about 45° to 80° C., and at a pressure of about 100 to 200 pounds per square inch, and maintaining the ratio of olefin to catalyst at a level to avoid substantial exhaustion of the catalyst by contacting the hydrogen sulfide and olefin with the catalyst in a plurality of units, each one of which includes less than the total quantity of olefin that can be converted to mercaptan by the catalyst before the catalyst reaches substantial exhaustion, separating reaction products from the catalyst complex after reaction of each unit charge for about 15 to 30 minutes and before charging the next successive unit to the reaction, and repeating the operation with successive unit charges until the activity of the catalyst is reduced too low for further use.

9. The method in accordance with claim 8 in which the mol ratio of triisobutylene per unit charge to catalyst is not in excess of 6:1.

10. The method in accordance with claim 8 in which the mol ratio of said triisobutylene per unit charge to catalyst is not in excess of 3:1.

11. The process in accordance with claim 6 in which the catalyst is anhydrous aluminum bromide.

12. The process in accordance with claim 6 in which the catalyst is anhydrous aluminum chloride.

13. The process in accordance with claim 6 in which the catalyst is a mixture of boron trifluoride and hydrogen fluoride.

14. The process in accordance with claim 6 in which the catalyst in fluoboric acid.

15. The process in accordance with claim 6 in which the catalyst is the hydrocarbon complex of the Friedel-Crafts catalyst used.

RICHMOND T. BELL.
CARLISLE M. THACKER.

REFERENCES CITED

The following references are of record in the file of this patent:

UNITED STATES PATENTS

| Number | Name | Date |
|---|---|---|
| 1,953,702 | Davidson | Apr. 3, 1934 |
| 2,352,435 | Hoeffelman | June 27, 1944 |
| 2,366,453 | Meadow | Jan. 2, 1945 |
| 2,434,510 | Olin | Jan. 13, 1948 |

OTHER REFERENCES

Thomas: "Anhydrous Aluminum Chloride in Organic Chemistry," Reinhold, New York, 1941.